United States Patent [19]

Fujiwara et al.

[11] Patent Number: 5,362,828
[45] Date of Patent: Nov. 8, 1994

[54] PROCESS FOR THE PRODUCTION OF VINYL CHLORIDE POLYMERS USING A COMBINATION OF MONOMER-SOLUBLE POLYMERIZATION INITIATORS

[75] Inventors: Makoto Fujiwara; Tadashi Amano, both of Kamisu, Japan

[73] Assignee: Shin-Etsu Chemical Co., Ltd., Tokyo, Japan

[21] Appl. No.: 75,249

[22] Filed: Jun. 11, 1993

[30] Foreign Application Priority Data

Jun. 11, 1992 [JP] Japan .................................. 4-177465

[51] Int. Cl.$^5$ ................................................ C08F 4/38
[52] U.S. Cl. ................................... 526/228; 526/224; 526/344.2
[58] Field of Search ........................................ 526/228

[56] References Cited

U.S. PATENT DOCUMENTS 3,687,867 8/1972 Lewis ................................... 526/228

Primary Examiner—Christopher Henderson
Attorney, Agent, or Firm—Millen, White, Zelano & Branigan

[57] ABSTRACT

The preparation of vinyl chloride-type polymers by suspension polymerization of vinyl chloride monomers in the presence of monomer-soluble polymerization initiators, wherein the monomer-soluble polymerization initiators utilized are a combination of (A) a compound which possesses neither a benzene ring nor an alkoxyl group, and has a half-life of 10 hours at 0.1 mol/l concentration in benzene solution at a temperature of 40°–50° C., and (B) 1-cyclohexyl-1-methylethylperoxy pivalate.

This method yields vinyl chloride-type polymers the qualities of which such as an initial colorization and thermal stability are effectively improved, without being affected by the limitations accompanied by the insufficient cooling capacity of the polymerization vessel in general. The preparative method further enables one to effectively avoid scale deposition in the polymerization vessel.

20 Claims, No Drawings

PROCESS FOR THE PRODUCTION OF VINYL CHLORIDE POLYMERS USING A COMBINATION OF MONOMER-SOLUBLE POLYMERIZATION INITIATORS

This invention relates to a manufacturing method for vinyl chloride type-polymers, particularly a manufacturing method which achieves high quality vinyl chloride-type polymers at high productivity.

BACKGROUND OF THE INVENTION

In general, vinyl chloride-type polymers are prepared by the suspension polymerization of vinyl chloride monomers or a mixture of vinyl-type monomers with vinyl chloride as a major constituent in an aqueous media using a monomer-soluble polymerization initiator. At this time, the types of monomer-soluble polymerization initiators employed have a large effect on the exothermic pattern during the polymerization reaction, polymerization duration, productivity, and scale deposition during the polymerization, as well as on the quality characteristics of polymers such as initial colorization, thermal stability, odor, and extraction resistance.

Further, recent trends aim to reduce the duration of the polymerization reaction in order to improve the productivity for vinyl chloride-type polymers. Therefore, the amount of polymerization initiators being utilized is increasing. However, the increased amount of utilized polymerization initiators brings up problems: the limitations accompanied by the insufficient cooling capacity of the polymerization instruments in general; the effects on polymer qualities, particularly on the initial colorization, thermal stability, the generation of strange odors caused by the residue of the polymerization initiators, the increased amount of the decomposition products, and the increase in the extractable components; and further the increased amount of scale deposit in the polymerization vessels.

SUMMARY OF THE INVENTION

Therefore, an object of the invention is to provide a manufacturing method for vinyl chloride-type polymers which does not possess problems such as the limitations accompanied by the insufficient cooling capacity of the polymerization instruments in general and the negative effects on polymer qualities, and which also suppresses the amount of scale deposit in the polymerization vessels.

Upon further study of the specification and appended claims, further objects and advantages of this invention will become apparent to those skilled in the art.

In accordance with the invention, there is provided a manufacturing method for vinyl chloride-type polymers by suspension polymerization of vinyl chloride monomers or a mixture of vinyl-type monomers with vinyl chloride as a major constituent in an aqueous media in the presence of a monomer-soluble polymerization initiator, wherein the monomer-soluble polymerization initiator utilized is a combination of (A) a compound, capable of initiating polymerization of the monomers, having a half-life of 10 hours at 0.1 mol/l concentration in benzene solution at a temperature of 40°–50° C. and which does not possess a benzene ring or an alkoxyl group; and (B) 1-cyclohexyl-1-methylethylperoxy pivalate.

The monomer-soluble polymerization initiator (A) of the invention does not possess a benzene ring or an alkoxyl group within the molecule. When a compound with a benzene ring within the molecule is utilized, for example, the obtained vinyl chloride-type polymers show a UV absorption peak in an extraction test. As a result, their use in the fields of medicine and food is limited. Further, the use of a compound with an alkoxyl group can lead to a problem of increased scale deposit.

In addition, the monomer-soluble polymerization initiator (A) should possess a half-life value of 10 hours at a temperature of preferably about 40°–50° C. and at a 0.1 mol/l concentration in benzene solution. The half-life of, e.g., a peroxide compound can be determined in accordance with the following procedure.

In general, pyrolyzation of an organic peroxide compound at a constant temperature is approximately expressed by a linear equation such as $$dx/dt = k(a-x) \quad (1)$$

$$\ln a/(a-x) = kt \quad (2)$$

where x is a concentration of decomposed peroxide; a is initial concentration of peroxide; k is pyrolyzation reaction constant; t is reaction time.

Since the half-life of the peroxide, $t_{\frac{1}{2}}$, is the reaction time when the concentration of the peroxide decreases to half of the initial concentration, the equation (2) above is expressed as: $\ln a/(a-a/2) = kt_{\frac{1}{2}}$, i.e., equation (3): $t_{\frac{1}{2}} = \ln 2/k$, and the value of reaction constant k is also determined as the slope of the plot of $\ln a/(a-x)$ vs. t.

If a compound's 10-hour half-life is at a temperature of less than 40° C., its sustaining activity becomes low. On the other hand, if a compound has a 10-hour half-life at 50° C. or higher, larger amounts of polymerization initiators are required. In either case, the vinyl chloride polymers obtained are generally inferior with respect to their quality characteristics such as initial colorization and extraction resistance.

Suitable monomer-soluble polymerization initiator A) which fulfill the above-mentioned conditions are, for example, peresters of the following formula (1):

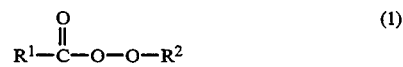

wherein $R^1$ and $R^2$ are each independently a substituted or unsubstituted n-alkyl group, sec-alkyl group, or tert-alkyl group, in each case having 1–20 carbon atoms. Sec-alkyl refers to alkyl groups of the structure R(R)CH— and tert-alkyl refers to alkyl groups of the structure R(R)(R)C—. Thus, for example, sec-hexyl can be 1-methylpentyl or 1-ethyl-butyl and tert-hexyl can be 1,1-dimethylbutyl or 1-methyl-1-ethyl-propyl. Representative examples of peresters of formula (1) and the temperature at which the respective compound has a 10-hour half-life at 0.1 mol/l in benzene solution are t-hexylperoxy neodecanoate (45° C.), t-butylperoxy neodecanoate (46° C.), and t-hexylperoxy neohexanoate (49° C.).

Other suitable polymerization initiators (A) are percarbonate compounds of the following formula (2):

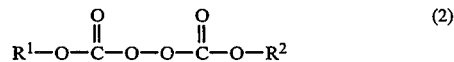

wherein $R^1$ and $R^2$ are the same as defined above for formula (1). Representative examples of percarbonates of formula (2) are diisopropylperoxy dicarbonate (41° C.), di-n-propylperoxy dicarbonate (41° C.), dimyristylperoxy dicarbonate (41° C.), and di-2-ethylhexylperoxy dicarbonate (43° C.). The number within the parentheses in these example compounds indicates the temperature at which each has a half-life of 10 hours at 0.1 mol/l in benzene solution.

The compounds for polymerization initiator (A) can be used individually or as a combination of two or more compounds. Among the above-mentioned compounds, the perester type compounds such as t-hexylperoxy neodecanoate, t-butylperoxy neodecanoate, and t-hexylperoxy neohexanoate are preferred.

The monomer-soluble polymerization initiator (B) which is combined with polymerization initiator (A) in the invention is 1-cyclohexyl-1-methylethylperoxy pivalate. This compound is expressed by the equation below:

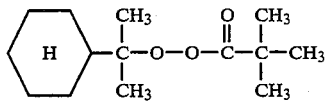

This initiator controls the reaction activity of the initiator (A) and functions as a quality controller for the resultant vinyl chloride polymers.

In accordance with the invention, the ratio of the monomer-soluble polymerization initiators (A) and (B) can vary depending upon the reaction conditions. However, in general, it is desirable for ratio (A)/(B) to be: 8/2–2/8, preferably 7/3–3/7 (by weight standard). When the initiator (A) is used in an amount more than this ratio, for example, its activity becomes undesirably low at the end of polymerization. On the other hand, use of the initiator (B) in an amount greater than this ratio makes heat removal at the end of polymerization difficult. Further, the total amount of initiators (A) and (B) are suitably 0.03–0.3 wt. %, based on the total weight of vinyl chloride-type monomers. Both of these polymerization initiators may be added by diluting them with a solvent, in combination with water and/or suspension reagents after making them as an emulsion or as a suspension by dispersing into water, or after the addition of these. They may also be injected into the reaction vessel by a pump with an applied pressure after the addition of the vinyl chloride monomers.

Monomers utilized in this invention are a single component of a vinyl chloride, or a mixture in which a major constituent is vinyl chloride along with other vinyl-type monomers which are copolymerizable with vinyl chloride (this mixture usually comprises at least 50 wt. % of vinyl chloride). Comonomers which can form copolymers with vinyl chloride are: α-olefins such as an ethylene, propylene, 1-butone, 1-pentone, 1-hexene, 1-heptene, 1-octene, 1-nonone, 1-decene, 1-undecene, 1-dodecene, 1-tridecone and 1-tetradecene; acrylic acid and its esters such as an acrylic acid, methyl acrylate, and ethyl acrylate; methacrylic acid and its esters such as a methacrylic acid and methyl methacrylate; maleic acid and its esters; vinyl esters such as vinyl acetate and a vinyl propionate; vinyl ethers such as a lauryl vinyl ether and an isobutyl vinyl ether; maleic acid anhydrous; acrylonitrile; styrene; vinylidene chloride; and other monomers which can form copolymers with vinyl chloride. These monomers can be utilized alone or in combinations of two or more monomer types.

In the invention, suspension polymerization of these monomers in aqueous media may employ dispersing agents commonly utilized for the polymerization of vinyl chloride-type monomers. Examples of suitable dispersing agents are water-soluble cellulose ethers such as a methyl cellulose, hydroxy ethyl cellulose, hydroxypropyl cellulose, and hydroxypropyl-methyl cellulose; water-soluble or monomer-soluble polyvinyl alcohols with partial saponification; acrylic acid polymers; water-soluble polymers such as a gelatin; monomer-soluble emulsifying agents such as a sorbitan monolaurate, sorbitan triolate, glycerin tristearate, and ethylene oxide-propylene oxide block copolymer; and water-soluble emulsifying agents such as a polyoxy-ethylene sorbitan monolaurate, polyoxy-ethylene glycerin oleate, and sodium laurate. These dispersing agents can be utilized alone or in combinations of two or more.

In the invention, the suspension polymerization itself can be performed by known methods, except that the above-mentioned two types of the monomer-soluble polymerization initiators are used in combination. For example, methods employed for placing the aqueous media, vinyl chloride-type monomers and dispersing agents into polymerization vessels, and their mixing ratios are similar to those employed in conventional methods.

The suspension polymerization of this invention is desirably performed at a temperature of about 55°–65° C., particularly 59°–65° C., in conjunction with the usage of the above-mentioned polymerization initiators.

Further, other agents which are suitably utilized for vinyl chloride-type polymerization may be added to this polymerization system as necessary. Examples are polymerization controllers, chain transfer agents, pH controllers, gelation improving agents, anti-static agents, crosslinking agents, stabilizers, fillers, anti-oxidants, buffers, and scale inhibitors.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding Japanese application 4-177465, are hereby incorporated by reference.

EXAMPLES

EXAMPLES 1 AND 2, AND COMPARATIVE EXAMPLES 1–5

An aqueous solution is made using 900 kg of deionized water and 760 g of a partially saponificated polyvinyl alcohol and is placed in a stainless steel made polymerization vessel with a 2.1 $m^3$ internal capacity. After vacuuming the vessel to 50 mmHg of internal pressure, 700 kg of vinyl chloride monomers are added. While stirring, the polymerization initiators, the types and amounts of which are listed in Table 1, are injected by pump under pressure. At the same time, polymerization is started by increasing the temperature. The polymerization reaction proceeds while maintaining the temperature at 61° C. Then, 200 g of mercapto ethanol are added after one hour and forty minutes from increasing the temperature. When the internal pressure reaches 6.0 kg/cm$^2$G, polymerization is halted, the unreacted monomers are recovered, and the obtained polymers are removed from the vessel as a slurry. The slurry is dehydrated, dried and utilized in later tests. These results are also listed in Table 1.

Condition of scale deposit within the polymerization vessel

The condition of scale deposition is evaluated using the following standards.

⊚: A metallic mirror surface shines without any scale deposit.

○: A slight cloudiness exists on the metallic mirror surface.

Δ: Some scales are observed on a part of the metallic surface.

X: A film-like scale covers the entire metallic surface.

Bulk density measurement

Bulk densities of the obtained polymers are measured following the method in the JIS K-6721.

Particle size distribution measurement

To determine particle size distribution, the obtained polymers are sieved using the #60, #100, and #200 sieves (following the JIS Z-8801 method). The amount of polymer passed through each sieve is weighed and expressed in weight %.

Measurement for the amount of fish eye

To measure the amount of fish eye, 100 weight parts of obtained polymer, 3.0 weight parts of epoxydated soy oil, 0.7 parts of cetanol, 1.0 part of butyl stearate, and 2.5 parts of a tin-type stabilizer are combined with a mixer. This mixture is made into a sheet using a 20 mm extruder at 170° C. of header temperature and at 205° C. of die temperature. From the sheet of 0.1 mm thickness and 30 mm width, a 50 m section is obtained. The amount of fish eye is indicated by the number of white transparent particles within a 1 m$^2$ area of this sheet.

Extraction test

A 15 g sample of obtained polymer is diluted in the extraction bottle with 300 ml of distilled water. The extraction bottle is placed in a sterilizer and left at 125° C. for 60 minutes. After cooling, the supernatant liquid of the extraction bottle is tested for UV absorption and the consumption of potassium permanganate. At this time, a sample with distilled water alone is utilized as a standard.

UV absorption

Absorbance is measured at the wavelengths of 220 nm and 241 nm. If the discrepancies from the standard values are at least 0.08 at 220 nm or at least 0.05 at 241 nm, then the sample is indicated by X, otherwise, it is indicated by ○.

Consumption of potassium permanganate

After the addition of potassium permanganate, the solution is titrated with sodium thiosulfate. If the discrepancy from the standard value is at least 1.00 cc, then the sample is indicated by X, otherwise by ○.

In the above tests of UV absorption and the consumption of potassium permanganate, the larger discrepancies from the standard values indicate that the employment of the sample as a medical resin is difficult.

Initial colorization

Into the 100 weight parts of obtained polymer, 1 weight part of tin laurate, 0.5 weight part of a cadmium-type stabilizer, and 50 weight parts of dioctyl phthalate are added. After the mixture is processed with a double-roll mill at 160° C. for five minutes, it is formed into a sheet with 0.8 mm thickness. Then this sheet is cut, piled and placed in the frame of 4 cm×4 cm×1.5 cm (thickness) size, which is then heated to 160° C. under the pressure of 65 to 70 kgf/cm$^2$ in order to prepare the sample. The sample is visually observed and evaluated based on the following standard.

⊚: The similar coloring as Example 1.

○: More yellowish than Example 1.

TABLE 1

|  | Ex. 1 | Ex. 2 | CE. 1 | CE. 2 | CE. 3 | CE. 4 | CE. 5 |
|---|---|---|---|---|---|---|---|
| Types and amounts of polymerization initiators (vs. VC monomer) | BPD 0.031% CMPP 0.031% | BPD 0.04% CMPP 0.02% | BPD 0.045% TMHP 0.045% | BPD 0.042% BPP 0.042% | BPD 0.055% | CMPP 0.10% | DEPD 0.031% CMPP 0.031% |
| Polymerization Conditions |  |  |  |  |  |  |  |
| Lowest jacket temp. (before mercapto addition) | 39° C. | 35° C. | 34° C. | 36° C. | 32° C. | 41° C. | 38° C. |
| (after mercapto addition) | 37° C. | 35° C. | 36° C. | 36° C. | 37° C. | 30° C. | 37° C. |
| Polymerization time | 4 hr. 3 min. | 3 hr. 20 min | 4 hr. | 4 hr. 5 min. | 4 hr. 7 min. | 4 hr 30 min. | 3 hr. 51 min. |
| Scale deposition | ⊚ | ⊚ | ○ | ○ | ○ | ⊚ | X |
| Quality of Polymers |  |  |  |  |  |  |  |
| Bulk density | 0.560 | 0.562 | 0.558 | 0.559 | 0.563 | 0.559 | 0.561 |
| Particle distribution pass % |  |  |  |  |  |  |  |
| #60 | 100 | 100 | 100 | 100 | 100 | 100 | 100 |
| #100 | 68.9 | 72.1 | 65.2 | 70.1 | 60.2 | 67.1 | 69.4 |
| #200 | 1.1 | 1.4 | 0.9 | 1.2 | 0.5 | 1.0 | 1.2 |
| Fish eye | 38 | 49 | 115 | 102 | 230 | 40 | 162 |
| Extraction Test |  |  |  |  |  |  |  |
| UV absorption | ○ | ○ | ○ | ○ | ○ | ○ | ○ |
| KMnO$_4$ comsumption | ○ | ○ | X | ○ | ○ | ○ | ○ |
| Initial | ⊚ | ⊚ | ○ | ○ | ⊚ | ○ | ○ |

TABLE 1-continued

|  | Ex. 1 | Ex. 2 | CE. 1 | CE. 2 | CE. 3 | CE. 4 | CE. 5 |
|---|---|---|---|---|---|---|---|
| colorization | | | | | | | |

Acronyms for the polymerization initiators in the table are defined as follows:
BPD: t-butylperoxy neodecanoate (46° C.)
BPP: t-butylperoxy pivalate (55° C.)
DEPD: di-(2-ethoxyethyl)peroxy dicarbonate (43° C.)
TMHP: di-3,5,5-trimethylhexanoyl peroxide (59.5° C.)
CMPP: 1-cyclohexyl-1-methylethylperoxy pivalate (51.8° C.)

In accordance with the invention, the combined use of two types of specific polymerization initiators resulted in the vinyl chloride-type polymers of which qualities such as initial colorization and thermal stability have effectively improved, without being affected by the limitations accompanied by the insufficient cooling capacity of the polymerization vessel in general, and further enabling one to effectively avoid scale deposition in the polymerization vessel.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a manufacturing method of manufacturing vinyl chloride-type polymers by suspension polymerization of vinyl chloride monomers, or a mixture vinyl chloride monomers and monomers capable of forming copolymers with vinyl chloride, in an aqueous media in the presence of a monomer-soluble polymerization initiator, the improvement wherein polymerization is conducted in the presence of the following combination of monomer-soluble polymerization initiators:

(A) a polymerization initiator compound having a half-life of 10 hours at 0.1 mol/l concentration in benzene solution and at a temperature of 40°–50° C., and wherein said polymerization initiator compound is
   a compound of formula (1)

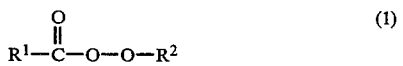

(1)

wherein $R^1$ and $R^2$ are each independently a n-alkyl group, sec-alkyl group, or tert-alkyl group, in each case having 1–20 carbon atoms; or
   a compound of formula (2)

(2)

wherein $R^1$ and $R^2$ are each independently a n-alkyl, sec-alkyl group, or tert-alkyl group, in each case having 1–20 carbon atoms; and (B) 1-cyclohexyl-1-methylethylperoxy pivalate; wherein the weight ratio of (A) to (B) is 8:2–2:8 and the total amount of (A) and (B) is 0.03–0.3 wt. % based on the total weight of monomers.

2. A method according to claim 1, wherein the monomers which are polymerized are a mixture of vinyl chloride monomers and at least one monomer selected from the group consisting of ethylene, propylene, 1-butene, 1-pentene, 1-hexene, 1-heptene, 1-octene, 1-nonene, 1-decene, 1-undecene, 1-dodecene, 1-tridecene, 1-tetradecene, acrylic acid, an ester of acrylic acid, methyl acrylate, ethyl acrylate, methacrylic acid, an ester of methacrylic acid, maleic acid, an ester of maleic acid, a vinyl ester, a vinyl ether, maleic acid anhydrous, acrylonitrile, styrene and vinylidine chloride.

3. A method according to claim 1, wherein polymerization is conducted in the presence of at least one dispersing agent selected from the group consisting of a water-soluble cellulose ether, a water-soluble polyvinyl alcohol with partial saponification, a monomer-soluble polyvinyl alcohol with partial saponification, an acrylic acid polymer, gelatin, a monomer-soluble emulsifying agent and a water-soluble emulsifying agent.

4. A method according to claim 1, wherein polymerization initiator compound (A) is
   a compound of formula (1)

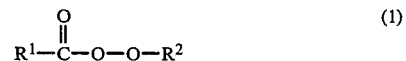

(1)

wherein $R^1$ and $R^2$ are each independently a n-alkyl group, sec-alkyl group, or tert-alkyl group, in each case having 1–20 carbon atoms.

5. A method according to claim 4, wherein polymerization initiator compound (A) is t-hexylperoxy neodecanoate, t-butylperoxy neodecanoate or t-hexylperoxy neohexanoate.

6. A method according to claim 5, wherein polymerization initiator compound (A) is t-hexylperoxy neodecanoate.

7. A method according to claim 5, wherein polymerization initiator compound (A) is t-butylperoxy neodecanoate.

8. A method according to claim 5, wherein polymerization initiator compound (A) is t-hexylperoxy neohexanoate.

9. A method according to claim 2, wherein polymerization initiator compound (A) is a compound of formula (2)

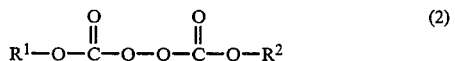

(2)

wherein $R^1$ and $R^2$ are each independently a n-alkyl group, sec-alkyl group, or tert-alkyl group, in each case having 1–20 carbon atoms.

10. A method according to claim 9, wherein polymerization initiator compound (A) is diisopropylperoxy dicarbonate, di-n-propylperoxy dicarbonate, dimyristylperoxy dicarbonate or di-2-ethylhexylperoxydicarbonate.

11. A method according to claim 1, wherein the weight ratio of (A) to (B) is 7:3–3:7.

12. A method according to claim 1, wherein said suspension polymerization is conducted using vinyl chloride monomers.

13. A method according to claim 1, wherein said suspension polymerization is conducted using a mixture containing at least 50 wt. % vinyl chloride monomers.

14. A method according to claim 1, wherein polymerization is conducted at a temperature of 55°–65° C.

15. A method according to claim 1, wherein polymerization is conducted at a temperature of 59°–65° C.

16. A method according to claim 1, wherein the polymerization is conducted in the presence of a combination of monomer-soluble polymerization initiators consisting of:
(A) a polymerization initiator compound having a half-life of 10 hours at 0.1 mol/l concentration in benzene solution and at a temperature of 40°–50° C., and wherein said polymerization initiator compound is
a compound of formula (1)

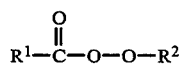
(1)

wherein $R^1$ and $R^2$ are each independently a n-alkyl group, sec-alkyl group, or tert-alkyl group, in each case having 1–20 carbon atoms; or
a compound of formula (2)

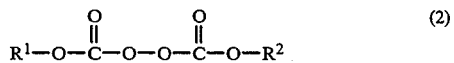
(2)

wherein $R^1$ and $R^2$ are each independently a n-alkyl group, sec-alkyl group, or tert-alkyl group, in each case having 1–20 carbon atoms; and (B) 1-cyclohexyl-1-methylethylperoxy pivalate.

17. A method according to claim 10, wherein polymerization initiator compound (A) is diisopropylperoxy dicarbonate.

18. A method according to claim 10, wherein polymerization initiator compound (A) is di-n-propylperoxy dicarbonate.

19. A method according to claim 10, wherein polymerization initiator compound (A) is dimyristylperoxy dicarbonate.

20. A method according to claim 10, wherein polymerization initiator compound (A) is di-2-ethylhexylperoxy dicarbonate.

* * * * *